United States Patent [19]

Arai

[11] Patent Number: 4,788,174

[45] Date of Patent: Nov. 29, 1988

[54] HEAT RESISTANT CATALYST AND METHOD OF PRODUCING THE SAME

[75] Inventor: Hiromichi Arai, Fukuoka, Japan

[73] Assignee: Catalysts and Chemicals Inc., Far East, Tokyo, Japan

[21] Appl. No.: 78,530

[22] Filed: Jul. 28, 1987

[30] Foreign Application Priority Data

Dec. 3, 1986 [JP] Japan .................................. 61-286730
Apr. 7, 1987 [JP] Japan .................................. 62-83711

[51] Int. Cl.$^4$ ........................ B01J 21/04; B01J 23/02; B01J 23/34; B01J 23/70
[52] U.S. Cl. .................................. 502/324; 502/306; 502/327; 502/328
[58] Field of Search ............... 502/306, 324, 327, 328; 423/213.5

[56] References Cited

U.S. PATENT DOCUMENTS

3,926,854  12/1975  Whelan et al. ................. 502/306 X
4,261,862  4/1981  Kinoshita et al. ................... 502/304

FOREIGN PATENT DOCUMENTS

0091814  10/1983  European Pat. Off. .
1442743  3/1969  Fed. Rep. of Germany .
216850  8/1973  France .
2168503  8/1973  France .
2118061  10/1983  United Kingdom .
829165  5/1981  U.S.S.R. ............................. 502/328

*Primary Examiner*—W. J. Shine
*Attorney, Agent, or Firm*—Ladas & Parry

[57] ABSTRACT

Excellent heat resistant high activity catalyst which retains catalyst activity at high temperatures of not less than about 1,200° C. is provided.

19 Claims, No Drawings

HEAT RESISTANT CATALYST AND METHOD OF PRODUCING THE SAME

BACKGROUND OF THE INVENTION

1. Field of the Invention

The present invention relates to heat resistant catalysts, and more particularly to heat resistant and high activity catalysts for use in catalytic reactions such as catalytic combustion, etc., and a method of producing the same.

2. Related Art Statement

Catalysts for catalytic combustion are widely used nowadays for abatement of carbon monoxide and hydrocarbons in exhaust gases from automobiles, for removal of noxious gases in exhaust gases from factories, for deodorization and for non-flame combustion, etc., however, as most of the catalysts have not enough heat resistivity, they are used in special consideration to avoid decrease of the catalyst activity by limiting or controlling operating temperature of the catalyst at a temperature lower than about 800° C. Under these circumstances, development of catalyst of much better heat resistant property has been earnestly desired. Further, catalytic combustions at higher temperature have been of interest in many fields such as gas turbines, boilers and jet engines, and appearance of a remarkably heat resistant and high activity catalyst capable of keeping its high activity even at an extremely high temperature, for example, at a temperature higher than 1,200° C., has been earnestly desired.

In general, a heat resistant catalyst can be produced by supporting catalyst materials on a heat resistant catalyst carrier. In point of this view, the inventors have made extensive studies to develop heat resistant compositions having by far the better heat resistant properties on the basis of an alumina carrier which has the most heat resistant properties among the catalyst carriers being used widely at present, and as the result of this, the inventors showed that the composition consisting mainly of $MeO \cdot 6Al_2O_3$ (Me being Ca and/or Ba and/or Sr) can be a catalyst carrier having especially superior heat resistant properties, in Japanese patent application No. 60(1985)-189967.

Further, the inventors showed that the above mentioned composition consisting mainly of $MeO \cdot 6Al_2O_3$ became more heat resistant when it was produced from a complex or mixed alkoxide of aluminum and a metal shown as Me, in Japanese patent application No. 61(1986)140287. In this patent application, the production method of the same are also proposed.

SUMMARY OF THE INVENTION

A catalyst in which catalyst components are supported by impregnation or coating on a catalyst carrier consisting mainly of $MeO \cdot 6Al_2O_3$ (Me being Ca Ba or Sr) is an extremely heat resistant catalyst when it is compared with any conventional catalyst with alumina carrier, but if it is used as a catalyst for catalytic combustion reaction, etc. operated at higher temperature than 1,200° C., sintering of the catalyst components occurs, decrease of the catalyst activity is unavoidable and it is not made a good use of the heat resistant property of the carrier. Therefore, an object of the present invention is to avoid this shortcoming and to provide especially superior heat resistant and high activity catalyst.

As the result of extensive studies to get extremely superior heat resistant catalyst, the inventors have found out that the extremely high activity and heat resistant catalysts are achieved by making special complex of the catalyst components and the catalyst carrier components, and then lead to this invention.

The present invention is a heat resistant catalyst consisting mainly of a composition which is expressed in a formula $A_{1-z}C_zB_xAl_{12-y}O_{19-\alpha}$ (wherein, A is at least one element selected from Ca, Ba and Sr, C is K and/or Rb, B is at least one element selected from Mn, Co, Fe, Ni, Cu and Cr, z is a value in a range of 0~about 0.4, x is a value in a range of about 0.1-4, y is a value in a range of $x-2x$, $\alpha$ is a value determined by the valence X, Y and Z of the respective element A, C and B and the value of x, y and z, and it is expressed as $\alpha = 1\frac{1}{2}\{X-z(X-Y)+xZ-3y\}$.

The catalyst of the present invention is suitable for catalytic combustion reaction processes especially of not less than about 1,000° C. and for any other various reactions which neccessitate high temperatures.

The present invention is also a method of producing a heat resistant catalyst comprising, dissolving and mixing a water soluble and/or alcohol soluble aluminum compound, a water soluble and/or alcohol soluble compound of element A selected from the group consisting of Ca, Ba and Sr, a water soluble and/or alcohol soluble compound of element C selected from the group consisting of K and Rb, a water soluble and/or alcohol soluble compounds of element B selected from the group consisting of Mn, Co, Fe, Ni, Cu and Cr in at least one solvent selected from the group consisting of water and alcohol in a $(B+Al):(A+C):B:C$ atomic ratio of about 100:(7–10):(4.2–16.7):(0–3.3) to effect precipitation, hydrolysis and/or thermal decomposition, forming a product in the solution, separating the product from the solution, and calcining the product at a temperature not less than 900° C.

Preferably, the precipitate product is formed by adding a coprecipitant or coprecipitating agent to the solution, the hydrolysis product is formed from hydrolysis of the solution, and the heat decomposition product is formed by heat decomposition of the gelatinous product.

Preferably, the product is obtained by a hydrolysis of complexed or mixed alkoxides of an aluminum alkoxide and an alkoxide of the element A with the use of an aqueous solution of a compound of the element B or elements B and C, or by a hydrolysis of an aluminum alkoxide with the use of an aqueous solution of a compound of the elements A and B or a compound of the elements a, B and C.

As a preferred embodiment of the present invention, this invention proposes a method of producing the heat resistant catalyst in which it is produced from raw materials of a complexed alkoxide or mixed alkoxides of aluminum and the metal A. This alkoxide method can provide the heat resistant catalyst which is superior to those produced by usual methods used for production of catalysts or catalyst carrier such as the solids mixing method or powders mixing method and the coprecipitation method in an aqueous solution thereof.

When the content of the element A and the element C in the heat resistant catalyst of the present invention is at a ratio of 8.3 atoms of the sum of the element A and the element C to 100 atoms of the sum of element B and Al, the composition $A_{l-z}C_zB_xAl_{12-y}O_{19-\alpha}$ becomes the most stable structure having superior heat stability or heat resistant properties. However, the content of the element (A+C) is not limited to this ratio, and the ratio of (A+C) atom: (B+Al) atom is desirable to be near to 8.3:100, for example about 7-10:100. When the content of (A+C) is larger than this range, AO or AO.$Al_2O_3$ in the catalyst becomes excessively large. When the content of the element (A+C) is smaller than this range, $Al_2O_3$, in the catalyst becomes also excessively large. Then, owing to the sintering of these AO, AO.$Al_2O_3$ or $Al_2O_3$, decrease of the specific surface area at high operating temperatures occurs, and hence decrease of the catalyst activity occurs.

It is not desirable to contain unnecessarily large amount of the element C in $A_{1-z}C_zB_xAl_{12-y}O_{19-\alpha}$ in this heat resistant catalyst of the present invention. Such a large amount of the element C causes decrease of the catalyst activity and gives bad effect to the heat resistant properties of the catalyst. The value of z which shows the content of the element C is desirable to be not more than 0.4.

The value of x which shows the content of the active component B in $A_{1-z}C_zB_xAl_{12-y}O_{19-\alpha}$ in this heat resistant catalyst of the present invention is desirably about 0.1-4 and especially about 0.2-3. If the x is below 0.1, catalyst activity is not good enough due to a lack of catalyst component, and if the x is above 4 many part of the active element B can not enter successfully into the layered aluminate structure of $A_{1-z}C_zB_xAl_{12-y}O_{19-\alpha}$ crystal and remained element B forms single oxide and causes decrease of the catalyst activity by sintering thereof. By the way, $A_{1-z}C_zB_xAl_{12-y}O_{19-\alpha}$, main component of the catalyst of the present invention, seems to have a layered aluminate structure which is similar to magnetoplumbite structure of $BaO.6Al_2O_3$ and $\beta$-alumina structure, from the X-ray diffraction study result, and it is considered that this specific structure gives superior heat resistant properties to the catalyst of this invention.

Preferably, at least a part of the composition expressed as the formula $A_{1-z}C_zB_xAl_{12-y}O_{19-\alpha}$ is a layered aluminate crystal structure in which the active element C and/or B is taken or fixed in the crystal lattic.

The heat resistant catalyst of the present invention can comprise a small amount of third component selected from a silica, rare earth metal oxides and alkali metal oxides in addition to alumina and oxides of elements A, C and B which compose $A_{1-z}C_zB_xAl_{12-y}O_{19-\alpha}$ heat resistant composition.

Main composition of the heat resistant catalyst of the present invention shown as $A_{1-z}C_zB_xAl_{12-y}O_{19-\alpha}$ is a complexed oxide of four oxides, that is, oxide of the element A, oxide of the element C, oxide of the element B, and aluminum oxide. Then, hereafter, these oxide will be explained respectively.

As a starting material for aluminum oxide used as main component for producing the heat resistant catalyst of the present invention, it is preferable to use alumina known as transition alumina, when using solids mixing method for producing the heat resistant catalyst. When using a precipitation method for producing the heat resistant catalyst, aluminum nitrate, aluminum sulfate, sodium aluminate or other water soluble aluminum compounds can be used as a starting material for aluminum oxide.

As a starting material for oxides of element A and element C, various kinds of compounds such as oxide, hydroxide, carbonate, nitrate and sulfate of the element A and C can be used. Hereinafter, though the explanation will be made mainly taking Ba as an example of element A and K as an example of element C the same applies to Ca, Sr and Rb.

As a starting material for metal oxide of element B, which is the main catalyst component of the heat resistant catalyst of the present invention, all the compound generally used as raw material for producing catalyst such as oxide, hydroxide, carbonate, nitrate, sulfate, chloride, salt of organic acid like acetate and ammine complex salt of the element B, and further acid of the element B and its salts such as chromic anhydride, manganite and chromate can be used. In case of the catalyst of the present invention, the B is preferable to be Mn, Fe, Co, Cu and/or Cr, and more preferable to be Mn and/or Co. Hereinafter, though the explanation will be made mainly taking Co as an example of element B, the same applies to Mn, Fe, Ni, Cu and Cr.

For producing the catalyst from those aluminum compounds, barium compounds, potassium compounds and cobalt compounds, various methods generally used for preparation of catalysts and catalyst carriers can be used, such as coprecipitation, solids mixing, kneading and impregnation methods.

In the present invention, a specific preparation method, so called alkoxide method, is proposed as the most preferable method for producing the heat resistant catalyst of this invention. As to starting materials of aluminum and barium oxides for this alkoxide method, various alkoxides of aluminum and barium can be used. However, as these alkoxides, alkoxides of 1-4 carbon atoms such as methoxide, ethoxide, isopropoxide and butoxide are preferable. Commercial alkoxides can be used, but those alkoxides produced by using aluminum and/or barium metal and alcohols can also be used.

The heat resistant catalyst of present invention can be used in powder form and in any shapes such as tablet, ring, sphere, extrusion, honeycomb, foam or other shape general in catalysts and catalyst carriers.

In general, the heat resistant catalysts of the present invention are processed to the finished product through intermediate and/or final steps of drying and calcination, but the calcination step is not always necessary and may be omitted, as the case may be. If the heat resistant catalyst is used as a catalyst for high temperature reaction, especially for catalytic combustion, the calcination is an important operation step for obtaining the heat resistant or thermally stabilized catalyst. For example, when the heat resistant catalyst is a catalyst for high temperature catalytic combustion process, it is naturally expected that the catalyst is exposed to a temperature higher than 1,300° C. during usage in the process. For dealing such situation, the catalyst is preferably be produced through calcination at a temperature of 1,300° C. or exceeding 1,300° C. At such high calcination temperature, alumina component in any catalysts carrier other than that of the present invention, such as $\gamma$-alumina carrier, silica-alumina carrier and alumina carriers containing rare earth element, alkali metal or other heat resistivity improving agent, is transited to $\alpha$-alumina phase followed by unavoidable remarkable decrease of specific surface area and accompanying decrease of the activity, especially of low temperature activity, of the catalysts using these carriers.

In producing the heat resistant catalyst of the present invention, it is usually preferable to calcine at a temperature of 900° C. or more. If the calcination is effected at a temperature exceeding 1,300° C., it is necessary to measure a correspondence relation between calcination temperature and specific surface area beforehand, and select suitable calcination conditions to obtain suitable range of specific surface area of the catalyst. For instance, in case of a catalyst for a catalytic combustion process, the calcination temperature is selected such that the specific surface area is not less than about 2 m$^2$/g.

The heat resistant catalyst of the present invention is preferably produced by mixing a water soluble alumina salt, a water soluble barium salt, a water soluble potassium salt, and a water soluble cobalt salt in water in an atomic ratio of (Co+Al):(Ba+K):Co:K of about 100:(7–10):(4.2:16.7):(0.3–3) to form an aqueous solution, adding a coprecipitant to the aqueous solution to produce a mixed composition in a form of a coprecipitate, removing impurities and solvent from the coprecipitate by washing and filtering the coprecipitate or evaporating to dryness, precalcining the coprecipitate at about 200°–500° C. and calcining the precalcined coprecipitate at a temperature of about 1,200°–1,500° C. for about 5–30 hours. The precalcination step may be omitted, as the case may be. As the water soluble aluminum compound in this case aluminum nitrate, aluminum sulfate, aluminum chloride, etc. can be used. As the water soluble potassium salt, potassium nitrate, potassium sulfate, potassium chloride, etc. can be used. As the water soluble barium compound, barium nitrate, barium chloride, etc. can be used. As the water soluble cobalt salt, cobalt nitrate, cobalt sulfate, cobalt chloride, etc. can be used. And, as the coprecipitating agent or coprecipitant, sodium hydroxide, sodium carbonate, caustic potash and aqueous ammonia, etc. can be used.

As the water soluble starting materials, basic salt such as sodium aluminate, barium hydroxide, potassium hydroxide and cobalt ammine complex salt, etc. can be used. In this case, acidic coprecipitant such as nitric acid or carbonic acid should be used.

In the more preferred alkoxide method, formation of the oxides of aluminum and barium from their alkoxides is preferably effected through their hydrolysis reactions. As a way to add the cobalt and potassium to the other component of the catalyst, there is the most preferable way in which an aqueous solution of a cobalt salt and potassium salt such as cobalt nitrate and potassium nitrate are added to the mixed alkoxides of aluminum and barium at the same time with the addition of the water necessary for hydrolysis.

Formation of the oxides of aluminum and barium from their alkoxide can be effected not only by hydrolysis but also by other process such as thermal decomposition, etc. It is not necessary that all of these oxides are prepared from the corresponding alkoxides. For example, alumina, barium carbonate, etc. can be added to the decomposition product of the alkoxides.

The hydrolysis reaction is more preferably effected at about 50°–100° C. than to effect at room temperature. Influence of pH of water added for hydrolysis reaction is not noticeable. But influence of aging time after addition of water on the specific surface area of the heat resistant composition is quite large. The longer the aging time is, the higher the specific surface area is. Thus, aging time is preferably at least one hour, and more preferably as long as possible, such as 5–10 hours within the economically permissible extent. The inventors have found out that specific surface area of the heat resistant component is influenced by an amount of water used in the hydrolysis, and that un-expectedly large specific surface area can be obtained even when the amount of water used in the hydrolysis is less than the amount of water necessary for hydrolyzing all the amount of existing complexed or mixed alkoxides into hydroxides and alcohols (hereinafter, abbreviated as "equivalent amount of water"). Thus, amount of water can be less than the equivalent amount of water. However, less than 0.5 equivalent amount of water is not preferable, because specific surface area of the produced heat resistant composition decreases rapidly. On the other hand, use of an unnecessarily large amount of water in the hydrolysis is not preferable, because it incurs an excessive investment cost and energy consumption, so that water amount is preferably equal to or less than about 10 equivalent amount of water from an economically view point. Therefore, generally amount of water to be used is about 0.5–10 equivalent amount of water. But, the amount of water is not exclusively limited to this range.

This alkoxide method is not limited exclusively to the above embodiment which uses mixed or complexed alkoxide of aluminum and barium as the starting material alkoxide, and includes many other modifications. For example, in an other embodiment, aluminum alkoxide is only used as the starting material alkoxide without using barium alkoxide. In an other embodiment, a mixed or complexed alkoxide of aluminum, barium and cobalt is used as the starting material alkoxide, for example. Also in these embodiments the remaining components of the catalyst are preferably used in the form of water soluble compounds and added to the alkoxide simultaneously with the addition of the water necessary for hydrolysis.

In order to give a lower temperature activity to the heat resistant catalyst of the present invention, it is effective to add a small amount of platinum group noble metal such as Pt, Ru, Rh and Pd, etc. on the catalyst, and such noble metal supported catalysts also are contained in the present invention.

Increase of the heat resistant properties of the heat resistant catalyst of the present invention is considered to be caused by the formation of heat resistant complexed oxides component $A_{1-z}C_zB_xAl_{12-y}O_{19-\alpha}$ which has layered aluminate crystal structure in which the active element C and/or B is taken or fixed in the crystal structure. That is, in the heat resistant catalyst of the present invention, stable layered aluminate crystal structure $A_{1-z}C_zB_xAl_{12-y}O_{19-\alpha}$ is formed at a relatively low temperature not higher than the transition temperature of transition alumina to α-alumina, which can prevent alumina from transition to α-alumina and sintering and afford good retention of specific surface area and activity at a higher temperature.

DESCRIPTION OF THE PREFERRED EMBODIMENTS

Hereinafter, the present invention will be explained in further detail by referring to examples.

EXAMPLE 1

Aluminum oxide, barium carbonate and cobalt oxide are fed to a ball mill and pulverized and mixed for about 24 hours. Atomic ratio of these three compounds $Al_2O_3:BaCO_3:CoO$ are set to 71.4:14.3:14.3. These mixed materials are then calcined at 1,450° C. for 5 hours in air to obtain catalyst of Example 1. BET specific surface area of the catalyst of Example 1 is 3.3 m$^2$/g.

REFERENTIAL EXAMPLE 1

Aluminum oxide and barium carbonate are fed to the ball mill and pulverized and mixed for about 24 hours. Atomic ratio of two compounds $Al_2O_3:BaCO_3$ are set to 85.7:14.3. These mixed materials are then calcined at 1,300° C. for 5 hours in air to obtain catalyst carrier. The catalyst carrier is impregnated in cobalt acetate and calcined at 1,300° C. for 10 hours to obtain catalyst of Referential Example 1. Content of cobalt was set to 10 weight % of the catalyst carrier, calculated as cobalt oxide (CoO). This one is the catalyst in which 10 weight % of CoO is supported on a $BaO.6Al_2O_3$ carrier. BET surface area of the catalyst of Referential Example 1 is 6.6 m²/g.

USE EXAMPLE 1

The catalysts of Example 1 and Referential Example 1 are used individually in a fixed bed flow type reactor of ambient pressure to measure their activities in methane combustion test. The gas used in the test consists of 1 vol % of methane and 99 vol % of air, and was fed to catalyst bed of the reactor at a space velocity of 48,000 $hr^{-1}$.

The results of the activity tests are shown in Table 1.

TABLE 1

| Catalyst | Composition | Specific surface area (m²/g) | T conv. y % (°C.) Y = 20 | Y = 50 | Y = 90 | Y = 100 |
|---|---|---|---|---|---|---|
| Example 1 | $BaO.CoO.5Al_2O_3$ | 3.3 | 678 | 719 | 748 | 760 |
| Referential Example 1 | 10% $CoO/BaO.6Al_2O_3$ | 6.6 | 721 | 754 | 762 | 762 |

Note:
Tconv.Y% (°C.) is a temperature at which methane conversion rate is Y%.

In spite of nearly same content of cobalt in catalysts of Example 1 and Referential Example 1, activities of these catalysts are remarkably different from each other. Catalyst of Example 1 having lower specific surface area shows higher activity than catalyst of Referential Example 1.

EXAMPLES 2 AND 3

Catalysts of Examples 2 and 3 are produced in the same manner and by us of the same starting materials as in Example 1, except that the component of Example 2 are shown as $BaCoAl_{11}O_{18.5}$ or $BaO.CoO.5.5Al_2O_3$ and Example 3 as $BaCoAl_{11.5}O_{18.25}$ or $BaO.0.5CoO.0.5.75Al_2O_3$, while the component of Example 1 is shown as $BaO.CoO.5Al_2O_3$. BET surface areas of the catalysts of Example 2 and 3 are 3.4 m²/g and 3.2 m²/g, respectively, and are lower than that of the catalyst of Referential Example 1, like the catalyst of Example 1.

USE EXAMPLE 2

By using catalysts of Examples 2 and 3, activity tests are proceeded in the same manner as Use Example 1. Test results are shown in the following Table 2.

TABLE 2

| Catalyst | Composition | Specific surface area (m²/g) | T conv. y % (°C.) Y = 20 | Y = 50 | Y = 90 | Y = 100 |
|---|---|---|---|---|---|---|
| Example 2 | $BaO.CoO.5.5Al_2O_3$ | 3.2 | 690 | 712 | 718 | 740 |
| Example 3 | $BaO.0.5CoO.5.75Al_2O_3$ | 3.4 | 700 | 724 | 743 | 763 |

In spite that the catalyst of Example 2 has lower specific surface area and has about same cobalt content as that of Referential Example 1, the activity of Example 2 is superior to Referential Example 1. It is noticeable that the catalyst of Example 3 has cobalt content of only about a half of that of Referential Example 1, but it has extremely higher activity than that of Referential Example 1.

EXAMPLE 4 AND USE EXAMPLE 3

Commercial aluminum isopropoxide and barium metal are dissolved in isopropyl alcohol at 80° C. for 5 hours, and then the solution is added with dropwise of aqueous cobalt acetate solution to effect hydrolysis thereof, in nitrogen atmosphere. After 12 hours of aging, the resulted suspension is dried at reduced pressure and at 80° C., precalcined at 600° C. and calcined at 1,350° C. for 5 hours to obtain catalyst of Example 4. The catalyst which is produced by the alkoxide method has a composition of $BaCoAl_{11}O_{18.5}$, which is the same as the catalyst of Example 2. BET surface area of the catalyst of Example 4 is 15.2 m²/g.

The catalyst of Example 4 is used in the same activity test as described in Use Example 1 to measure its activity. The result is shown in Table 3.

TABLE 3

| Catalyst | Composition | Specific surface area (m²/g) | T conv. y % (°C.) Y = 20 | Y = 50 | Y = 90 | Y = 100 |
|---|---|---|---|---|---|---|
| Example 4 | $BaO.CoO.5.5Al_2O_3$ | 15.2 | 686 | 706 | 708 | 709 |

Catalyst of Example 4 produced by the alkoxide method has remarkably improved higher activity and more particularly has largely improved activity in the range of higher activity, compared with the catalyst of Example 2 produced by the powder or solid mixing method.

EXAMPLE 5 AND REFERENTIAL EXAMPLE 2

Catalyst of Example 5 are produced by the same manner as Example 1, except that chromium oxide ($Cr_2O_3$) are used in place of cobalt oxide (CoO). Composition of this catalyst is shown as $BaCrAl_{11}O_{19}$ or $BaO.CrO_{1.5}.5.5Al_2O_3$.

On the other hand, catalyst of Referential Example 2 are produced by using the same carrier as the catalyst of Referential Example 1, impregnating anhydrous chromic acid on this carrier and calcining at 1,300° C. for 5 hours. This catalyst is 10 weight % of $Cr_2O_3$ supported on $BaO \cdot 6Al_2O_3$ carrier. BET surface area of the catalysts of Example 5 and Referential Example 2 are 3.0 m²/g and 6.4 m²/g, respectively.

USE EXAMPLE 4

Using the catalysts of Example 5 and Referential Example 2, methane combustion tests are proceeded individually to compare their activities. Results of the tests are shown in Table 4.

TABLE 4

| Catalyst | Composition | Specific surface area (m²/g) | T conv. y % (°C.) Y = 20 | Y = 50 | Y = 90 | Y = 100 |
|---|---|---|---|---|---|---|
| Example 5 | $BaO \cdot CrO_{1.5} \cdot 5.5Al_2O_3$ | 3.0 | 726 | 748 | 757 | 760 |
| Referential Example 2 | 10% $Cr_2O_3/BaO \cdot 6Al_2O_3$ | 6.4 | 747 | 784 | 788 | 790 |

Similar to cobalt catalyst, chromium catalyst of the present invention has superior activity than that of supported catalyst produced by mere impregnation method.

EXAMPLE 6 AND USE EXAMPLE 5

Barium isopropoxide and aluminum isopropoxide are dissolved in isopropyl alcohol, and then the solution is added with dropwise of aqueous manganese acetate solution to effect hydrolysis thereof. After 12 hours of aging, the resulted suspension is dried under reduced pressure at 80° C., and then resulted powder is heat decomposed at 400° C. for 5 hours in hydrogen atmosphere, and calcined at 1,200° C. in nitrogen atmosphere to obtain catalyst of Example 6. BET surface area of the catalyst of Example 6 is 10 m²/g.

The catalyst of Example 6 is used in the same methane combustion activity test as described in Use Example 1 to measure its activity. The result is shown in Table 5.

TABLE 5

| Catalyst | Composition | Specific surface area (m²/g) | T conv. y % (°C.) Y = 20 | Y = 50 | Y = 90 | Y = 100 |
|---|---|---|---|---|---|---|
| Example 6 | $BaO \cdot MnO \cdot 5.5Al_2O_3$ | 10 | 574 | 649 | 730 | 800 |

The catalyst of Example 6 which has Mn as catalyst component shows extremely higher activity in the low conversion range than the cobalt catalyst of Example 1. However, at the conversion rate of 100%, the latter has rather higher activity than the former catalyst.

EXAMPLES 7-17 AND USE EXAMPLE 6

In the same manner as the production method of Example 4, $BaB_xAl_{12-x}O_{19-\alpha}$ (wherein, $B_x$ are Mn, $Mn_2$, Co, Fe, Ni, Cu, Cr, $Co_{0.5}Mn_{0.5}$, and $Cr_{0.5}Ni_{0.5}$) are prepared by using isopropyl alcohol solution of barium alkoxide and aluminum isopropoxide and aqueous solution of acetate salt or nitrate salt of various metals (B). However, all the catalysts are calcined at 1,300° C. Thereafter each of these catalysts is measured on methane combustion activity by the same test method as described in Use Example 1.

Moreover, catalyst of Example 17 are obtained by impregnating palladium nitrate on the cobalt catalyst of Example 10, heat decomposed at 500° C. for 5 hours and calcined at 1,200° C. for 5 hours.

Results of the tests are shown in Table 6.

TABLE 6

| Catalyst Example | Active metals | Composition | T conv. y % (°C.) Y = 10 | Y = 90 |
|---|---|---|---|---|
| 7 | Mn | $BaMnAl_{11}O_{19-\alpha}$ | 530 | 740 |
| 8 | Fe | $BaFeAl_{11}O_{19-\alpha}$ | 560 | 790 |
| 9 | Mn, Co | $BaMn_{0.5}Co_{0.5}Al_{11}O_{19-\alpha}$ | 560 | 790 |
| 10 | Co | $BaCoAl_{11}O_{19-\alpha}$ | 690 | 720 |
| 11 | Cr | $BaCrAl_{11}O_{19-\alpha}$ | 700 | 760 |
| 12 | Cr,Ni | $BaCr_{0.5}Ni_{0.5}Al_{11}O_{19-\alpha}$ | 700 | 795 |
| 13 | Mn | $BaMn_2Al_{10}O_{19-\alpha}$ | 500 | 740 |
| 14 | Mn | $BaMnAl_{11}O_{19-\alpha}$ | 540 | 750 |
| 15 | Cu | $BaCuAl_{11}O_{19-\alpha}$ | 610 | 840 |
| 16 | Ni | $BaNiAl_{11}O_{19-\alpha}$ | 700 | 860 |
| 17 | Co, Pd | 1% $Pd/BaCoAl_{11}O_{19-\alpha}$ | 360 | 490 |

EXAMPLE 18

Commercial aluminum isopropoxide and barium metal are dissolved in isopropyl alcohol at 80° C., for 5 hours, and then the solution is added with dropwise of aqueous solution of cobalt acetate and potassium nitrate to effect hydrolysis thereof, in nitrogen atmosphere. After 12 hours of aging, the resulted suspension is dried in reduced pressure and at 80° C., precalcined at 500° C. and calcined at 1,350° C. for 5 hours to obtain catalyst of Example 18. The catalyst produced by this alkoxide method has a composition of $Ba_{0.8}K_{0.2}CoAl_{11}O_{19-\alpha}$. BET surface area is 18.2 m²/g.

EXAMPLES 19-22

Catalyst of Example 19 is prepared in the same manner as in Example 18, except that manganese acetate is used in place of cobalt acetate. This catalyst has a composition of $Ba_{0.8}K_{0.2}MnAl_{11}O_{19-\alpha}$ and BET surface area of 23.3 m²/g.

Also, catalyst of Examples 20, 21 and 22 are prepared in the same production method as in Example 19, but the feed amount of potassium nitrate and barium metal are changed. Compositions of these catalysts of Examples 20, 21 and 22 are $Ba_{0.6}K_{0.4}MnAl_{11}O_{19-\alpha}$, $Ba_{0.9}K_{0.1}MnAl_{11}O_{19-\alpha}$ and $BaMnAl_{11}O_{19-\alpha}$, respectively.

EXAMPLE 23

Commercial aluminum isopropoxide is dissolved in 2 hours in isopropyl alcohol at 80° C., and then the solution is added with dropwise of an aqueous solution of barium acetate, manganese acetate and potassium nitrate to effect hydrolysis thereof. After 12 hours of aging, the resulted suspension is filtered, and the filtrate is dried at 120° C. for 24 hours and calcined at 1,350° C. for 5 hours to obtain a catalyst of Example 23. The catalyst has a composition of $Ba_{0.8}K_{0.2}Mn_nAl_{11}O_{19-2}$. BET surface area is 15.0 m²/g.

USE EXAMPLE 7

The catalysts of Examples 18, 19, 20, 21, 22 and 23 are used in the same methane combustion activity test as in Use Example 1 to measure the activities. The results are shown shown in Table 7.

TABLE 7

| Catalyst | Composition | BET surface area (m²/g) | T conv. y % (°C.) Y = 20 | Y = 50 | Y = 90 | Y = 100 |
|---|---|---|---|---|---|---|
| Example 18 | $Ba_{0.8}K_{0.2}CoAl_{11}O_{19-\alpha}$ | 18.2 | 691 | 699 | 705 | 705 |
| Example 19 | $Ba_{0.8}K_{0.2}MnAl_{11}O_{19-\alpha}$ | 23.3 | 548 | 607 | 692 | 782 |
| Example 20 | $Ba_{0.6}K_{0.4}MnAl_{11}O_{19-\alpha}$ | 22.3 | 554 | 618 | 724 | 818 |
| Example 21 | $Ba_{0.9}K_{0.1}MnAl_{11}O_{19-\alpha}$ | 18.5 | 573 | 635 | 720 | 803 |
| Example 22 | $BaMnAl_{11}O_{19-\alpha}$ | 13.7 | 591 | 656 | 742 | 818 |
| Example 23 | $Ba_{0.8}K_{0.2}MnAl_{11}O_{19-\alpha}$ | 15.0 | 550 | 609 | 695 | 785 |

As seen from the above Table 7, catalyst using Mn as an active metal have extremely superior activity than the catalyst using Co.

Effect of the addition of potassium is also remarkable, and the catalyst activity is increased by the addition of potassium until the value of z which shows addition amount of potassium reaches to 0.2, while the catalyst activity is decreased in case of z=0.4.

The value of z is preferable to be not more than about 0.4.

As described in detail in the foregoing, according to the present invention, remarkably heat resistant catalyst having always higher activity than that of conventional alumina supported catalysts especially at high temperature, can be obtained. Therefore, the present invention is eminently useful for industries.

Though the present invention has been described with specific examples and numeral values, it is of course apparent to those skilled in the art that various changes and modifications thereof are possible without departing from the broad spirit and aspect of the present invention as hereinafter claimed.

What is claimed is:

1. A heat resistant catalyst consisting essentially of compositions of the formula $Al_{1-z}C_zB_xAl_{12-y}O_{19-\alpha}$ wherein, A is at least one element selected from the group consisting of Ba, Ca and Sr, C is K and/or Rb, B is at least one element selected from the group of Mn, Co, Fe, Ni, Cu and Cr, z is a value in a range of 0- about 0.4, x is a value in a range of about 0.1-4, is a value in a range of x-2x and α is a value which is determined by the valency X, Y, and Z of the respective element A, C and B and the value of x, y and z and is shown as $\alpha = 1 - \frac{1}{2}\{X - z(X-Y) + xZ - 3Y\}$.

2. A heat resistant catalyst as defined in claim 1, which contains a platinum group noble metal on the surface of the catalyst consisting essentially of $A_{1-z}C_zB_xAl_{12-y}O_{19-\alpha}$ composition.

3. A heat resistant catalyst as defined in claim 1 or 2, wherein atomic ratio of the sum of elements A plus C to the sum of element B plus Al is in a range of about (7-10):100.

4. A heat resistant catalyst as defined in claim 1, wherein the element A is Ba the element C is K, and the element B is Mn and/or Co.

5. A heat resistant catalyst as defined in claim 1, wherein x is a value in the range of about 0.2-3.

6. A heat resistant catalyst as defined in claim 1, wherein at least a part of the oxides of the element A and Al in the composition $A_{1-z}C_zB_xAl_{12-y}O_{19-\alpha}$ is a decomposition product of complexed alkoxides and/or mixed alkoxides of the element A and Al.

7. A heat resistant catalyst as defined in claim 6, wherein decomposition product of alkoxides is a hydrolysis product or heat decomposition product.

8. A heat resistant catalyst as defined in claim 6 or 7, wherein the alkoxides have 1-4 carbon atoms.

9. A heat resistant catalyst as defined in claim 1, wherein at least a part of the composition expressed as the formula $A_{1-z}C_zB_xAl_{12-y}O_{19-\alpha}$ is in a layered aluminate crystal structure in which the active element C and/or B is taken or fixed in the crystal lattice.

10. A heat resistant catalyst as defined in claim 1, which is used as a catalyst in a catalytic combustion process.

11. A heat resistant catalyst as defined in claim 10, which is used as a catalyst in a catalytic combustion process of not less than about 1,000° C.

12. A method of producing a heat resistant catalyst comprising, dissolving and mixing a water soluble and/or alcohol soluble aluminum compound, a water soluble and/or alcohol soluble compound of element A selected from the group consisting of Ca, Ba and Sr, a water soluble and/or alcohol soluble compound of element C selected from the group consisting of K and Rb, a water soluble and/or alcohol soluble compound of element B selected from the group consisting of Mn, Co, Fe, Ni, Cu and Cr in at least one solvent selected from the group consisting of water and alcohol in a (B+Al):(A+C):B:C atomic ratio of about 100:(7-10):(4.2-16.7):(0-3.3) to effect precipitation, hydrolysis and/or thermal decomposition, forming a product in the solution, separating the product from the solution and calcining the product at a temperature of not less than 900° C.

13. A method of producing a heat resistant catalyst as defined in claim 12, wherein the product is obtained by a hydrolysis of complexed or mixed alkoxide of an aluminum alkoxide and an alkoxide of the element A with the use of an aqueous solution of a compound of the element B or elements B and C.

14. A method of producing a heat resistant catalyst as defined in claim 12, wherein the product is obtained by a hydrolysis of an aluminum alkoxide with the use of an aqueous solution of a compound of the elements A and B or a compound of the elements A, B, and C.

15. A method of producing a heat resistant catalyst as defined in claim 13 wherein the alkoxides have 1-4 carbon atoms.

16. A method of producing a heat resistant catalyst as defined in claim 12, wherein the amount of water used for the hydrolysis is at least about 0.5 equivalent amount of water.

17. A method of producing a heat resistant catalyst as defined in claim 12, wherein the hydrolysis is effected at a temperature of about 50°-100° C.

18. A method of producing a heat resistant catalyst as defined in claim 12, wherein an aging is effected for at least about 1 hour after the addition of water for the hydrolysis.

19. A method of producing a heat resistant catalyst as defined in claim 12, wherein the element A is Ba, the element C is K, and the element B is Mn and/or Co.

* * * * *

UNITED STATES PATENT AND TRADEMARK OFFICE
CERTIFICATE OF CORRECTION

PATENT NO. : 4,788,174
DATED : November 29, 1988
INVENTOR(S) : Hiromichi Arai

It is certified that error appears in the above-identified patent and that said Letters Patent is hereby corrected as shown below:

Column 11, line 42-

Delete "$Al_1$" and substitute therefor ---$A_1$---

Signed and Sealed this

Twelfth Day of December, 1989

Attest:

JEFFREY M. SAMUELS

*Attesting Officer*    *Acting Commissioner of Patents and Trademarks*